United States Patent [19]

Mounts et al.

[11] 4,125,861
[45] Nov. 14, 1978

[54] VIDEO SIGNAL ENCODING

[75] Inventors: Frank W. Mounts, Colts Neck; Arun N. Netravali, Matawan, both of N.J.; Birendra Prasada, Nun's Island, Canada

[73] Assignee: Bell Telephone Laboratories, Incorporated, Murray Hill, N.J.

[21] Appl. No.: 825,777

[22] Filed: Aug. 18, 1977

[51] Int. Cl.² .............................................. H04N 7/12
[52] U.S. Cl. .................................................... 358/133
[58] Field of Search .................. 358/133, 141; 325/38, 325/38 A

[56] References Cited

U.S. PATENT DOCUMENTS

| | | | |
|---|---|---|---|
| 3,621,397 | 11/1971 | Morotani et al. | 325/38 |
| 3,699,446 | 10/1972 | Sainte-Beuve | 325/38 A |
| 3,784,737 | 1/1974 | Waehner | 358/133 |
| 3,824,590 | 7/1974 | Limb | 340/347 AD |
| 3,833,900 | 9/1974 | Bahl et al. | 340/347 DD |
| 3,971,987 | 7/1976 | Carrubba et al. | 325/38 B |
| 3,973,199 | 8/1976 | Widmer | 325/38 B |
| 4,005,411 | 1/1977 | Morrin | 340/347 DD |

*Primary Examiner*—Richard Murray
*Attorney, Agent, or Firm*—Barry H. Freedman

[57] ABSTRACT

When a video signal is encoded using differential pulse code modulation (DPCM) techniques, the frequency of occurrence of the various quantizer output or representative levels is non-uniform; usually, low levels occur more frequently than high levels, and this characteristic can be used to advantage by applying the DPCM output to a variable length encoder before transmission. The present invention increases this advantage by intentionally forcing the quantizer output to particular levels when doing so is not harmful to the picture fidelity. By so doing, the entropy of the encoded signal is reduced by as much as 25 percent.

20 Claims, 6 Drawing Figures

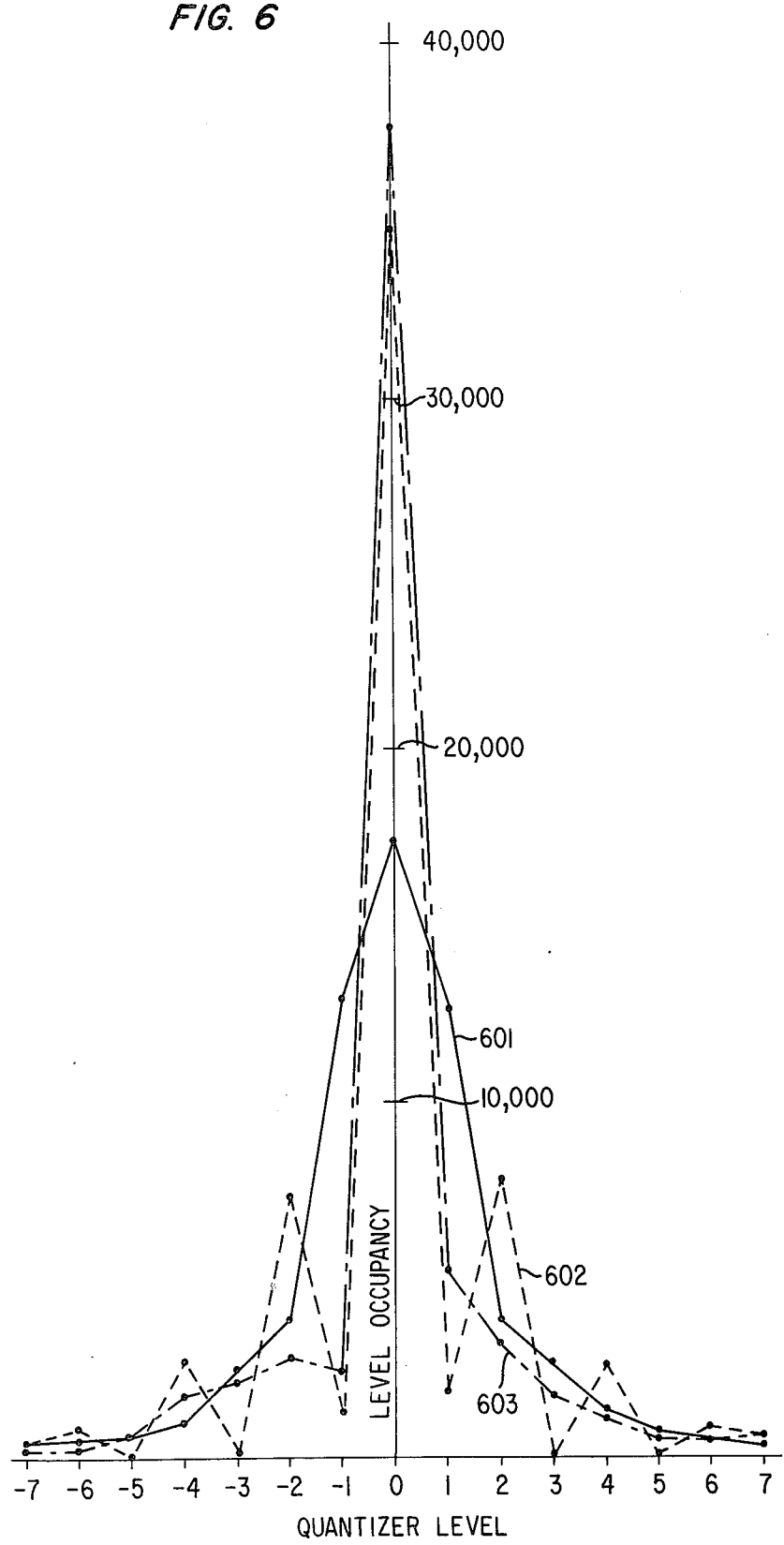

VIDEO SIGNAL ENCODING

BACKGROUND OF THE INVENTION

1. Field of the Invention

The present invention pertains generally to encoding of information signals and, in particular, to digital encoding of video signals using differential pulse code modulation (DPCM).

2. Description of the Prior Art

In recent years, great strides have been made in reducing the redundancy in digitally encoded video signals, thereby allowing transmission of pictures over facilities having reduced bandwidth without unduly sacrificing fidelity. Recent improvements have taken many directions. For example, certain interframe coding systems take note of the fact that relatively few changes occur in corresponding picture elements in successive frames; accordingly, such systems detect these changes, and transmit information concerning only active areas. However, interframe systems requires considerable memory capability, and can thus be costly to implement.

Other prior art video encoding systems, particularly those of the differential pulse code modulation (DPCM) type, place great emphasis on the logic circuits used to generate a prediction of the next input sample. The prediction is subtracted from the input signal to yield an error signal, which, once quantized, becomes the next output signal. At the receiver, the same prediction logic is used to reconstruct the original input signal. In such systems, the predictions are obtained from various combinations of previous encoder outputs. Since better predictions can be obtained using more samples, the combinatorial logic can become quite complex and costly, and the same logic must be used twice, in both the transmitter and in the receiver.

Yet other prior art video encoders achieve increased encoding efficiency by using various compression/expansion characteristics in the quantizer, and by otherwise adapting the quantizer characteristic in accordance with one or more attributes of the input signal. For example, companding may be linear, exponential, logarithmic, or some combination of these or other functions. Further, quantizers having a coarse characteristic may be used where the picture area is busy or active, while a fine characteristic (using more bandwidth) is reserved for relatively flat or inactive picture regions. These techniques, while generally successful, again have certain limitations. For example, in the situation where "future" information is used to control the quantization characteristics, the availability of multiple quantizers in the encoder requires transmission to the receiver of information identifying which one was utilized. This requirement adds to the number of bits needed to represent a given picture element.

In view of the foregoing, it is the broad object of the present invention to reduce the redundancy in an encoded version of a video signal with apparatus that is not unduly complex or costly. Specific objects are to provide an intraframe encoder (not requiring a large frame memory) which has a generally simple predictor disposed in its feedback loop, and which eliminates the need to transmit to the receiver information concerning the particular quantization characteristic used in the encoding process, even though "future" information is used in switching the quantization characteristics.

SUMMARY OF THE INVENTION

Each of the foregoing and additional objects are achieved in accordance with the present invention by a video encoding system which utilizes differential pulse code modulation (DPCM) in conjunction with variable length coding so as to increase advantages obtained due to the fact that the frequency of occurrence of the various output or representative levels of the encoder's quantizer is not the same. Generally speaking, the present invention intentionally forces the quantizer output to particular representative levels different from the "normal" output levels, when such deviation will not be harmful to picture fidelity. The "different" levels are ones which the quantizer would produce in response to an input different from the input being quantized. With this adaptation, the differences in frequency of occurrence between the individual quantizer output levels becomes even more pronounced, and this in turn enables variable length encoding with fewer bits per picture element (pel).

In one specific arrangement called alternate collapsing, the quantizer output is forced to an adjacent level either above or below certain normal levels, depending upon which direction of shift produces a smaller error. However, if the error exceeds a threshold which varies as function of picture activity, the shift is deemed harmful and is inhibited.

In another arrangement called delayed collapsing, the quantizer output is conditionally shifted to the adjacent lower level which, statistically, occurs more frequently. However, this lower level is transmitted to the receiver only if both the present sample and the next sample may be encoded with errors that do not exceed two (possibly different) variable thresholds similar to the threshold described above.

Since the logic circuitry used to determine when the quantizer output is shifted from its normal value to a different value is controlled by an activity signal and the signals present in the encoder's forward or direct loop, the present invention is not restricted to use with any particular predictor in its feedback loop; indeed, a relatively simple predictor may be used. Of course, the same simple predictor would then appear in the remote receiver. Also, since coding is accomplished on an intraframe basis, only a small memory or delay element is needed to store a limited number of picture element values in the neighborhood of the pel being encoded. In addition, since the quantizer representative levels, whether collapsed or uncollapsed, must be included within the same set of preselected possible levels, the receiver need not be furnished with information about whether a particular output was collapsed.

BRIEF DESCRIPTION OF THE DRAWING

The present invention will be more fully appreciated by consideration of the following detailed description, when read in light of the accompanying drawing in which:

FIG. 6 graphically illustrates the occupancy of the different quantizer levels for the apparatus of FIGS. 4 and 5 and for a prior art non-adaptive encoder.

DETAILED DESCRIPTION

(A) Level Collapsing Generally

Figure 1:
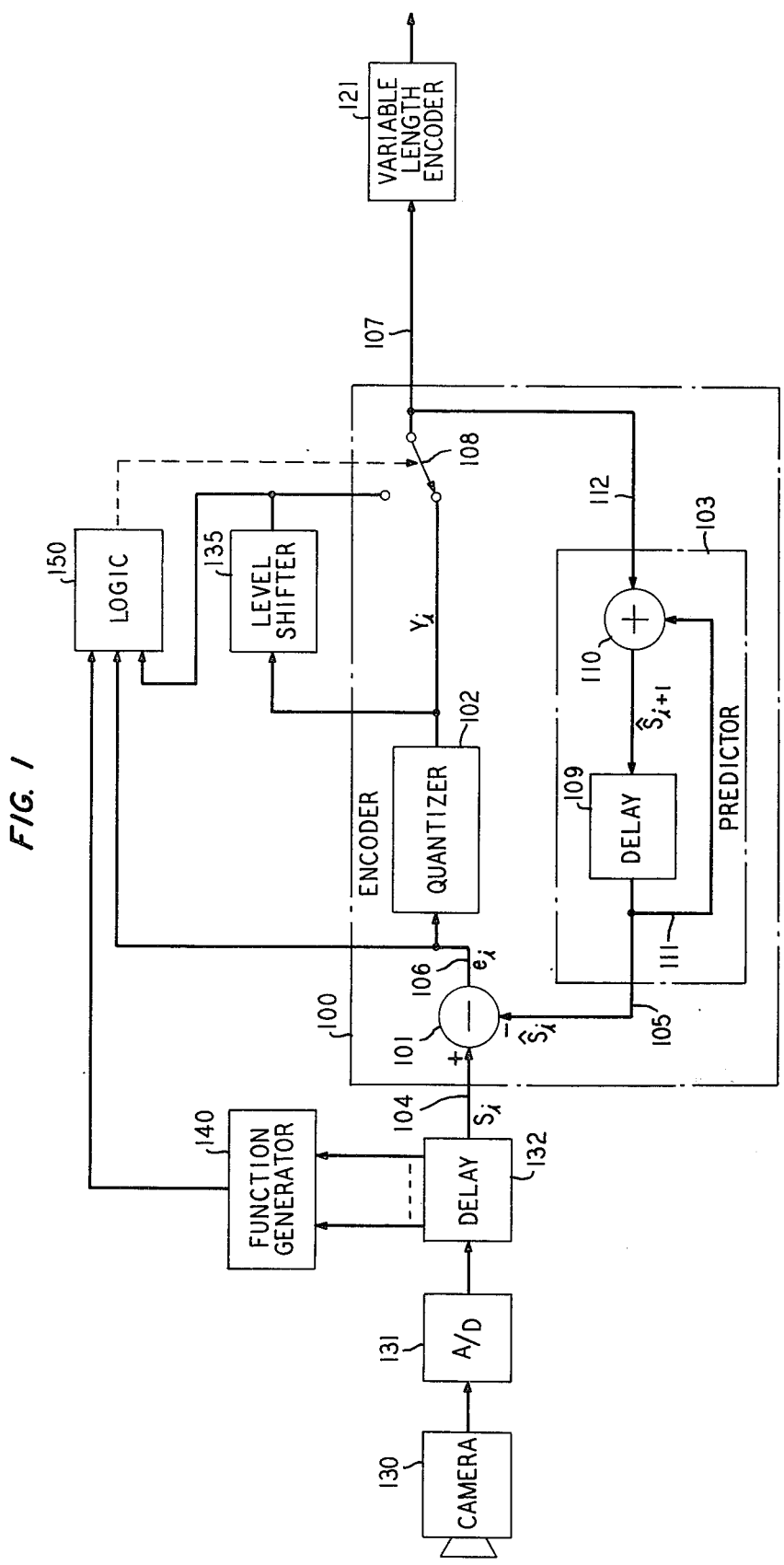
FIG. 1 is a general block diagram of a video signal encoding system constructed in accordance with the principles of the present invention.

A video encoding system arranged in accordance with the present invention includes a conventional differential pulse code modulation (DPCM) encoder shown within the block designated 100 in FIG. 1. Encoder 100 includes a subtraction circuit 101 and a quantizer 102 in its forward or direct loop, and a predictor designated generally at 103 in its feedback loop. Input signals $S_i$ to encoder 100 are obtained conventionally by scanning the image being encoded with a camera 130, and then by sampling and converting the camera output to digital form in A/D converter 131. (The subscript "$i$" is used hereinafter, to designate a time sequence of digital samples.) The output of converter 131 is then passed through a delay circuit 132, which may include a shift register or a series of flip-flops, the purpose of which will be described hereinafter. The output of circuit 132 on line 104 is coupled to encoder 100 via one input terminal of subtractor 101, which receives as its other input a predicted value $\hat{S}_i$ of the next input sample on line 105. The difference signal $(S_i - \hat{S}_i)$ output from subtractor 101 on line 106 is denominated the prediction error, $e_i$, which consists of both sign and magnitude information. The magnitude of $e_i$ is applied to the input of quantizer 102, to be described hereinafter. The output of quantizer 102, denominated the quantized error signal $Y_i$, is applied to the encoder output terminal 107 via a switch 108 (also to be discussed below) and to the input of predictor 103 in the feedback loop. $Y_i$ is assumed to take the same sign as $e_i$.

Predictor 103 serves simply to accumulate the quantized error signals $Y_i$ applied thereto so as to generate the predicted value $\hat{S}_i$ of the next input sample. The accumulation can be accomplished by combining, in an adder 110, the quantized error signal $Y_i$ with the predicted version $\hat{S}_i$ and then applying the algebraic sum denominated $\hat{S}_{i+1}$ to a delay circuit 109, which may be a shift register of flip-flop. The output of circuit 109 is coupled to subtractor 101 on line 105 and to adder 110 on line 111.

It is to be noted here that the signals input to encoder 100 on line 104 are multibit words which can be processed serially, or preferably in parallel, within the encoder. However, the multiple stages of subtractor 101 and adder 110 are not shown, for purposes of convenience. Overload logic may be provided in the predictor circuit, in accordance with well-known design criteria. Also, as stated previously, $Y_i$ retains the same sign as $e_i$, which may be negative, so that adder 110 must be capable of performing signed arithmetic.

Figure 2:
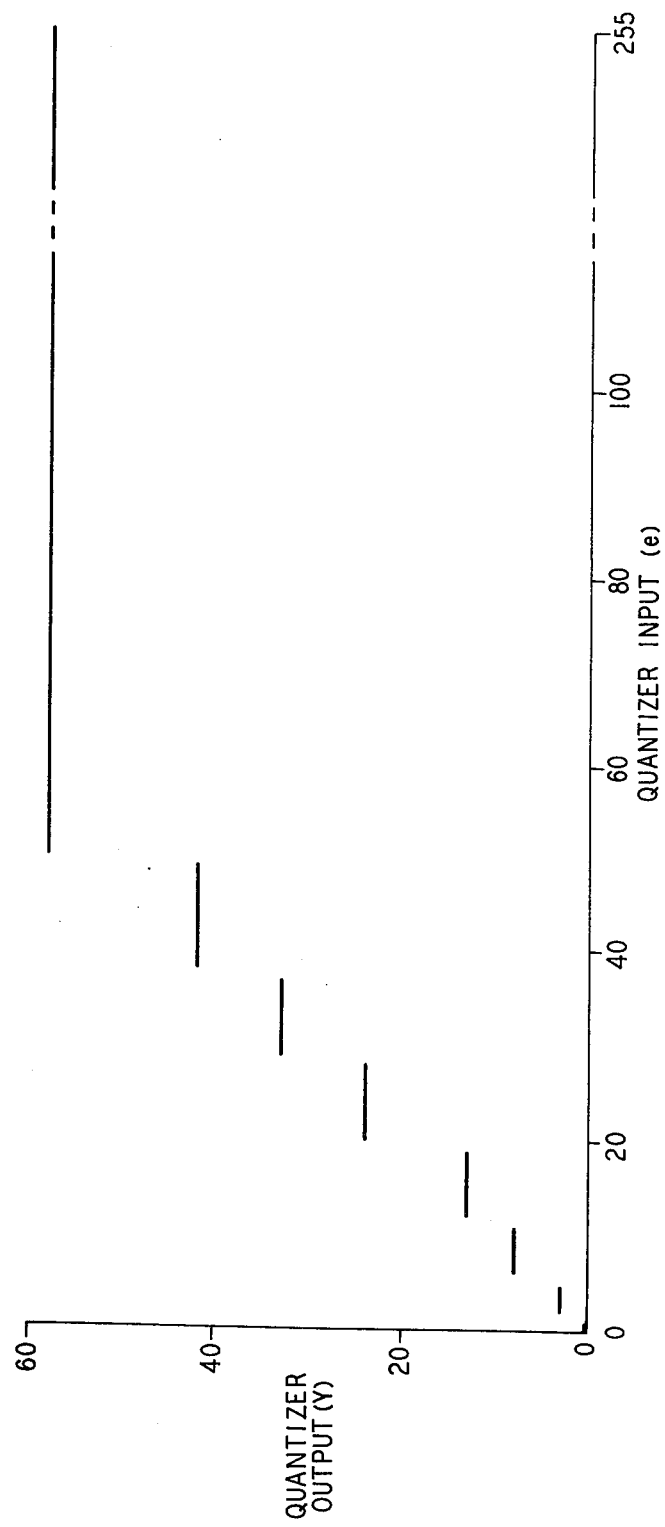
FIG. 2 is a graph showing a possible transfer characteristic for the quantizer of FIG. 1.

Since the purpose of quantizer 102 is to provide compression of the input data applied thereto, its input/output or transfer characteristic is generally a step-wise linear function of the type shown in FIG. 2. The quantizer input, which is the prediction error signal $e_i$, can be thought of as having a magnitude or level $|e_i| = e$ which falls within one of a plurality of mutually exclusive decision ranges; the boundaries of these decision ranges are called decision levels, and are denoted by $X_k$ for $k = 0, 1, 2 \ldots N$. The output $Y_i$ of quantizer 102 has a different magnitude or level $|Y_i| = Y$, sometimes denominated a representative level, for each decision range. If the representative levels are denoted by $Y_k$ for $k = 0, 1, 2 \ldots N-1$, then the relationship between the quantizer input $e$ and output $Y$ may be written thus:

If $X_k < e \leq X_{k+1}$, then $Y = Y_k$, for $k = 1, 2 \ldots N-1$, and if $X_o \leq e \leq X_1$, then $Y = Y_o$. Generally speaking, $Y_k$ falls within the range between $X_k$ and $X_{k+1}$. Quantizer 102 may be implemented in the form of a read-only memory which is preprogrammed for the input/output relationship of FIG. 2. In a real quantizer, only the magnitude of the input is typically quantized, and the sign of the input is simply carried through to the output.

Compression is achieved in quantizer 102 by making the number N of representative levels much less than the number of possible values which the input signal may assume. For example, the quantizer input may have a magnitude range of between 0 and 255, thus requiring an 8-bit representation. In comparison, the quantizer output may have only eight different magnitude levels ($N = 8$), thus requiring only a 3-bit representation.

From FIG. 2, it is to be noted that the size of the intervals or steps between adjacent decision levels in the quantizer 102 need not be uniform. Rather, step sizes for small values of $e$ are conventionally made smaller than step sizes for large values of $e$ since quantization errors for small values of $e$ are more visible than for high values of $e$. Despite non-uniform step sizes, statistical nonuniformity is exhibited in the frequency of occurrence of the various representative levels. For example, the frequency of occurrence of representative levels in a photo entitled "checker girl" which may be found in an article by Netravali and Prasada in the April, 1977 *Proceedings of the IEEE* entitled "Adaptive Quantization of Picture Signals Using Spatial Masking" is shown in the following table:

TABLE 1

| Representative Level ($Y_k$) | Occurrences |
|---|---|
| K = 0 | 17427 |
| K = 1 | 12620 |
| K = 2 | 3824 |
| K = 3 | 2646 |
| K = 4 | 1382 |
| K = 5 | 776 |
| K = 6 | 534 |
| K = 7 | 475 |
| K = -1 | 12920 |
| K = -2 | 3724 |
| K = -3 | 2471 |
| K = -4 | 1082 |
| K = -5 | 676 |
| K = -6 | 497 |
| K = -7 | 450 |

To take advantage of the non-uniform statistics displayed in Table 1, the output of encoder 100 at terminal 107 is applied to a variable length coder 121 before transmission to a remote location. The function of coder 121 is to assign to each different representative level output from quantizer 102 a unique code word representative thereof. These code words have non-uniform lengths, such that frequently occurring bit patterns are represented with words having fewer bits, and less frequently occurring patterns are represented by longer words. Accordingly, if the probability of occurrence of the lower levels in Table 1 is increased, the encoding can be accomplished with increased efficiency, or stated differently, with reduced redundancy or entropy. Variable length encoder 121 may be a read-only memory programmed in a manner described in *Proceedings of the IEEE* September, 1952, by D. A. Huffman entitled "A Method for Construction of Minimum Redundancy Codes". Other types of variable length encoders could also be used.

Before proceeding with a description of the remaining circuitry in FIG. 1, which serves the above purpose, a specific example of coding with encoder 100 will be instructive. In Table 2, the intensity of picture elements or samples along a scan line (graded to fall within a range between 0 and 255) is shown in the first column:

TABLE 2

| Col. 1<br>PEL INTENSITY<br>(Input $S_i$ to<br>Encoder 100) | Col. 2<br>PREDICTION ERROR $e_i$<br>Input to Quantizer<br>102 | Col. 3<br>REP. LEVEL $Y_i$<br>Output of<br>Quantizer 102 | Col. 4<br>LEVEL NO. K | Col. 5<br>NEXT PREDICTION<br>(Output $S_i$ of<br>Predictor 103) |
|---|---|---|---|---|
| 28  | 0   | 0   | ·0  | 28 |
| 31  | + 3 | + 3 | +1  | 28 |
| 45  | +14 | +15 | +3  | 31 |
| 49  | + 3 | + 3 | +1  | 46 |
| 47  | − 2 | − 3 | −1  | 49 |
| 49  | + 3 | + 3 | +1  | 46 |
| 48  | − 1 | 0   | 0   | 49 |
| 12  | −37 | −33 | −5  | 46 |
| 10  | − 6 | − 8 | −2  | 16 |
| 8   | 0   | 0   | 0   | 8  |
| 10  | + 2 | + 3 | +1  | 8  |
| 10  | − 1 | 0   | 0   | 11 |
| 4   | − 7 | − 8 | −2  | 11 |
| 1   | − 2 | − 3 | −1  | 3  |

Assuming that the output of predictor 103 is initially the same as the first input value, that the input/output characteristic of quantizer 102 is as shown in FIG. 2, and that switch 108 is in the position shown in FIG. 1, then the prediction error (column 2) is computed by subtracting the "next prediction" (column 5) from the intensity value input (column 1). For each prediction error in column 2, a representative level output from quantizer 102 (column 3) is obtained with the aid of FIG. 2. The "next prediction" (column 5) is then computed by algebraically combining the output of quantizer 102 with the "next prediction" value from the previous sample. The correspondence between the output of the encoder (column 3) and a level number K (column 4) may be achieved by a simple mapping process wherein the quantized values ranked in ascending order are assigned a different integer 0,1,2. . . N. These level numbers are merely conceptual aids to better understanding of the present invention and do not correspond to any signals present within the encoder.

While the small number of samples listed in Table 2 does not accurately reflect the statistics of real video signals, as was stated previously, Table 1 does indicate that lower levels occur much more frequently than higher levels in real images. This non-uniformity is desirable, since variable length encoding assigns shorter code words to more frequently occurring levels. The present invention increases the above advantage by an adaptive coding strategy wherein instead of representing $X_k < e \leq X_{k+1}$ as $Y_k$, its representation is changed to $Y_j$, where $j$ is a level different from level $k$ ($k \neq 0$) and the goal here is to give level $j$ a greater probability of occurrence than it had before the shift. However, the change or shift is not made if the quantization error $e - Y_j$ generated thereby will adversely affect the picture being encoded. Stated differently, the visibility of the quantization noise must be below a certain threshold before the level change is allowed. In determining visibility, spatial detail surrounding the pel being encoded is considerd, since highly detailed areas will mask quantization noise better than flat areas. Since level changes are generally (though not universally) made from a less frequently occurring higher level to a more frequently occurring lower level (i.e., towards the "inner" quantizer levels) the present technique may be referred to as "level collapsing".

Referring again to FIG. 1, the present invention, broadly speaking, contemplates applying delayed samples of the input signal which are output from circuit 132 to a function generator 140 which provides an indication of picture activity. This indication (represented "M") is applied to a logic circuit 150. The output of delay circuit 132 which is applied to encoder 100 may itself be subject to only a partial delay, so that the inputs to function generator 140 may truly represent the "neighborhood" of the pel being encoded, i.e., samples occurring both before and after the sample being encoded.

Another input to logic 150 is the magnitude of the error signal $e$ output from subtractor 101. In addition, the output of quantizer 102 is applied to a level shifter 135, the output of which is also coupled to logic 150. The function of level shifter 135 is to convert the quantized output Y of quantizer 102 from its normal level $k$ to a different level $j$. This conversion, which amounts to a simple mapping procedure, may be implemented as a separate read-only memory which is arranged to associate a particular $Y_j$ with each $Y_k$, in accordance with some predetermined mapping algorithm.

Alternatively, since quantizer 102 may itself be a ROM, it is possible to combine the quantizing and level shifting functions in a single unit which receives a prediction error signal $e$ and generates, in response thereto, at least first and second quantized signals $Y_k$ and $Y_j$, wherein the first signal $Y_k$ is the normal quantizer output (i.e., $Y_k$ has a magnitude which falls within the decision range associated with $e$) and the second signal $Y_j$ has a different magnitude which lies outside that decision range. Indeed, it is possible, as will be seen hereinafter, to arrange the level shifter 135 to produce two outputs $Y_{j1}$, $Y_{j2}$ which have values above and below the normal output $Y_k$. Again, it is important to point out here that the shifting or collapsing of the quantizer output from $Y_k$ to $Y_j$ amounts to an alteration of the quantizer transfer characteristic in a particular manner: $Y_j$ is a representative level including within the set of predetermined representative levels that may be output from the quantizer. However, it is a level that is not ordinarily associated with the quantizer input then present.

Logic 150 is designed, broadly speaking, to evaluate quantization error or difference between the error signal $e$ and the quantized error signal $Y_j$ (the level of which has been shifted away from its normal value $Y_k$) to determine if $Y_j$ can be output from the encoder 100. This decision depends on the visibility of $(e−Y_j)$, which is a function of the activity indicator "M". The output of logic 150 is used to control the position of switch 108, so that either the output $Y_k$ from quantizer 102 or the output $Y_j$ from level shifter 135 is coupled to output terminal 107.

The activity indicator M may be computed in various ways, some of which are described in the article by Netravali and Prasada cited above. One function that has proved useful in representing the activity at pel $x,y$ is given as follows:

$$M_{x,y} = \sum_{n=x-1}^{x+1} \sum_{t=y-1}^{y+1} \left( \frac{|m_{n,t}^H| + |m_{n,t}^V|}{2} \right) \alpha \, ||(n,t) - (x,y)|| \quad (1)$$

wherein $||(n,t)−(x,y)||$ is the Euclidean distance between points $(n,t)$ and $(x,y)$ normalized by the distance between horizontally adjacent pels; $m_{n,t}^H$ and $m_{n,t}^V$ are the horizontal and vertical slopes of the image intensity at point $(n,t)$; $\alpha$ is a weighting factor generally taken to be 0.35; and $x$ and $y$ are the Euclidean coordinates of the pel being encoded. Thus, $M_{x,y}$ is the weighted sum of the average of the magnitude of the horizontal and vertical slopes of the intensity at the neighboring picture elements of the element being encoded.

Figure 3:
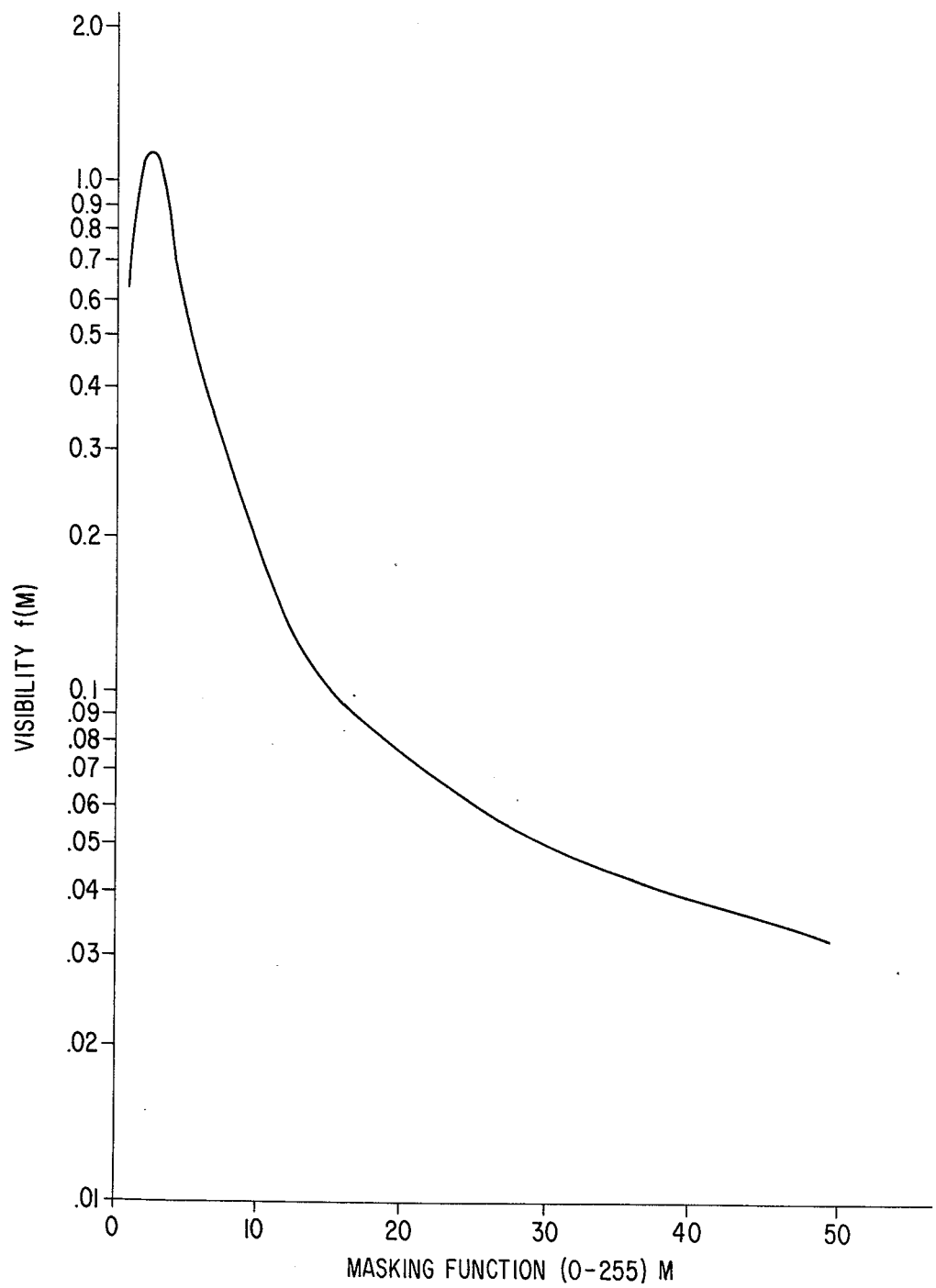
FIG. 3 is a graph showing the relationship between a masking function M indicative of spatial activity in the image being encoded and a function $f(m)$ which indicates the visibility of quantization errors.

A threshold T is generated from the activity indicator M using the relationship T $\alpha 1/f(M)$, where the relationship between a visibility function $f(M)$ and M can be as shown in FIG. 3. The exact functional relation can vary somewhat from picture to picture, but $f(M)$ generally varies inversely as M. The computation of T, in the apparatus of FIG. 1, is made within logic 150; it is generally true that the threshold T varies directly as the picture activity M, since busy pictures can better "conceal" quantization errors.

(B) Alternate Collapsing

One specific embodiment of the present invention utilizes a technique which may be termed "alternate collapsing". In this embodiment, the quantizer output can be shifted either up or down one level, depending upon which shift direction produces the smaller quantizer error. However, the shift to an adjacent level is only made *from* certain preselected levels *to* the adjacent "non-selected" levels. In this way, the statistical probability of occurrence of the non-selected levels is increased, enabling the variable length encoder to operate with increased efficiency. The selected levels can be either odd or even. However, as described hereinabove, the shift is only made if the difference between the prediction error and the new representative level is less than a threshold which is indicative of picture activity.

Figure 4:
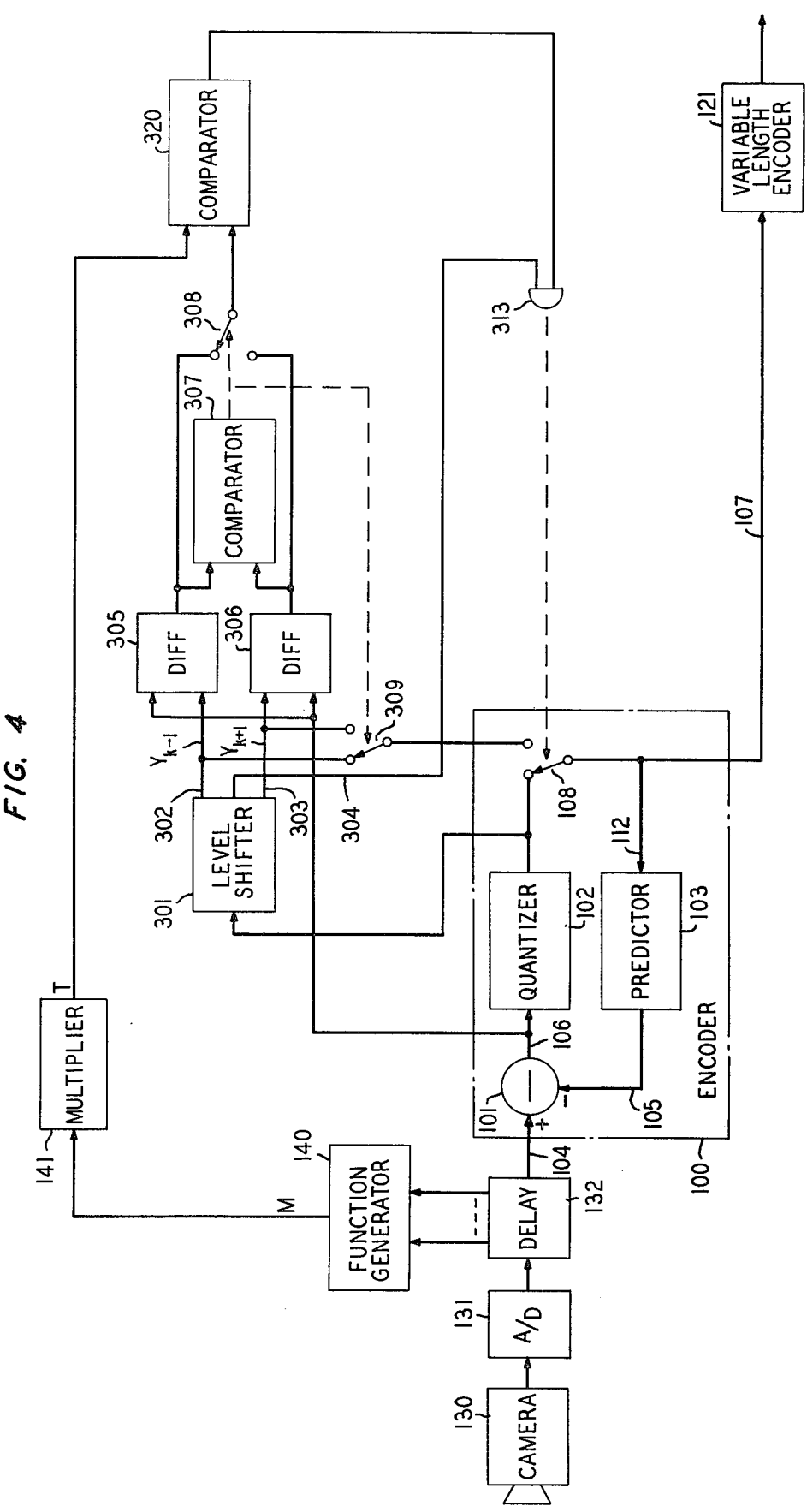
FIG. 4 is a block diagram of a video signal encoding system in accordance with the present invention wherein the quantizer output may be shifted to adjacent levels above or below the normal quantizer output.

A block diagram of an encoding system utilizing alternate collapsing is shown in FIG. 4. As in FIG. 1, the system comprises a DPCM encoder 100 which includes a subtractor 101, a quantizer 102 and a predictor 103. The normal output $Y_k$ of quantizer 102 is applied to a level shifter 301 having three outputs 302, 303 and 304. Shifter 301 is arranged to output on lines 302 and 303 the adjacent quantizer output levels $Y_{k-1}$ and $Y_{k+1}$, when $k$ has certain values (for example, when $k$ is odd). However, when $k$ is even, shifter 301 produces a low output on line 304, which acts to render the output of an AND gate 313 low. As a result, switch 108 remains in the position shown in FIG. 4, so that the normal output $Y_k$ from quantizer 102 is passed to predictor 103. The type of transfer function described for shifter 301 is easily implemented in one or more ROMs, the outputs of which might follow the pattern illustrated in the following table:

TABLE 3

| Input Y(k) to shifter 301 | Output Y(k−1) Line 302 | Output Y(K+1) Line 303 | Output Line 304 |
|---|---|---|---|
| $Y_0$ | don't care | don't care | LOW |
| $Y_1$ | $Y_o$ | $Y_2$ | HIGH |
| $Y_2$ | don't care | don't care | LOW |
| $Y_3$ | $Y_2$ | $Y_4$ | HIGH |
| $Y_4$ | don't care | don't care | LOW |
| $Y_5$ | $Y_4$ | $Y_6$ | HIGH |
| $Y_6$ | don't care | don't care | LOW |
| $Y_7$ | $Y_6$ | $Y_8$ | HIGH |
| $Y_8$ | don't care | don't care | LOW |

The level values output from shifter 301 on lines 302 and 303 are applied to a pair of difference circuits 305 and 306, respectively, each of which receive second inputs from the output of subtractor 101. Both circuits 305 and 306 thus provide, at their outputs, an indication of the magnitude of the error between the prediction signal $e$ and the level shifted quantizer outputs $Y_{k-1}$ and $Y_{k+1}$, respectively. The outputs of circuits 305 and 306 are then applied to a comparator 307, which is arranged to determine which error is smaller. The output of comparator 307 is used to control the positions of switches 308 and 309; if $$|e - Y_{k-1}| \leq |e - Y_{k+1}|$$

then the switches are positioned as shown in FIG. 4. If $Y_{k+1}$ is the better approximation, the switches are repositioned.

When $Y_{k-1}$ more closely approximates $e$ than does $Y_{k+1}$, the corresponding quantization error is passed through switch 308 to a firsrt input of a comparator 320. If $Y_{k+1}$ is the better approximation, its corresponding quantization error is selected for coupling through to the comparator. The second input to comparator 320 is derived from a multiplier 141, which multiplies the output M of function generator 140 by the function $1/f(M)$ to yield the threshold T discussed above. As before, generator 140 receives its inputs from delay circuit 132. If the picture activity is high enough to permit the shift from $Y_k$ to $Y_{k-1}$ or $Y_{k+1}$, the output of comparator 320 goes high, enabling AND gate 313 to reposition switch 108. When repositioned, the output of switch 309 (either $Y_{k-1}$ or $Y_{k+1}$) is coupled to predictor 103 and to variable length encoder 121. If, on the other hand, the picture activity is insufficient to mask the error caused by shifting the quantizer output, the output of gate 313 is low, keeping switch 108 in the position shown in FIG. 4. This will couple the normal output $Y_k$ of quantizer 102 to predictor 103 and to encoder 121 for eventual transmission to a remote location.

(C) Delayed Collapsing

Figure 5:
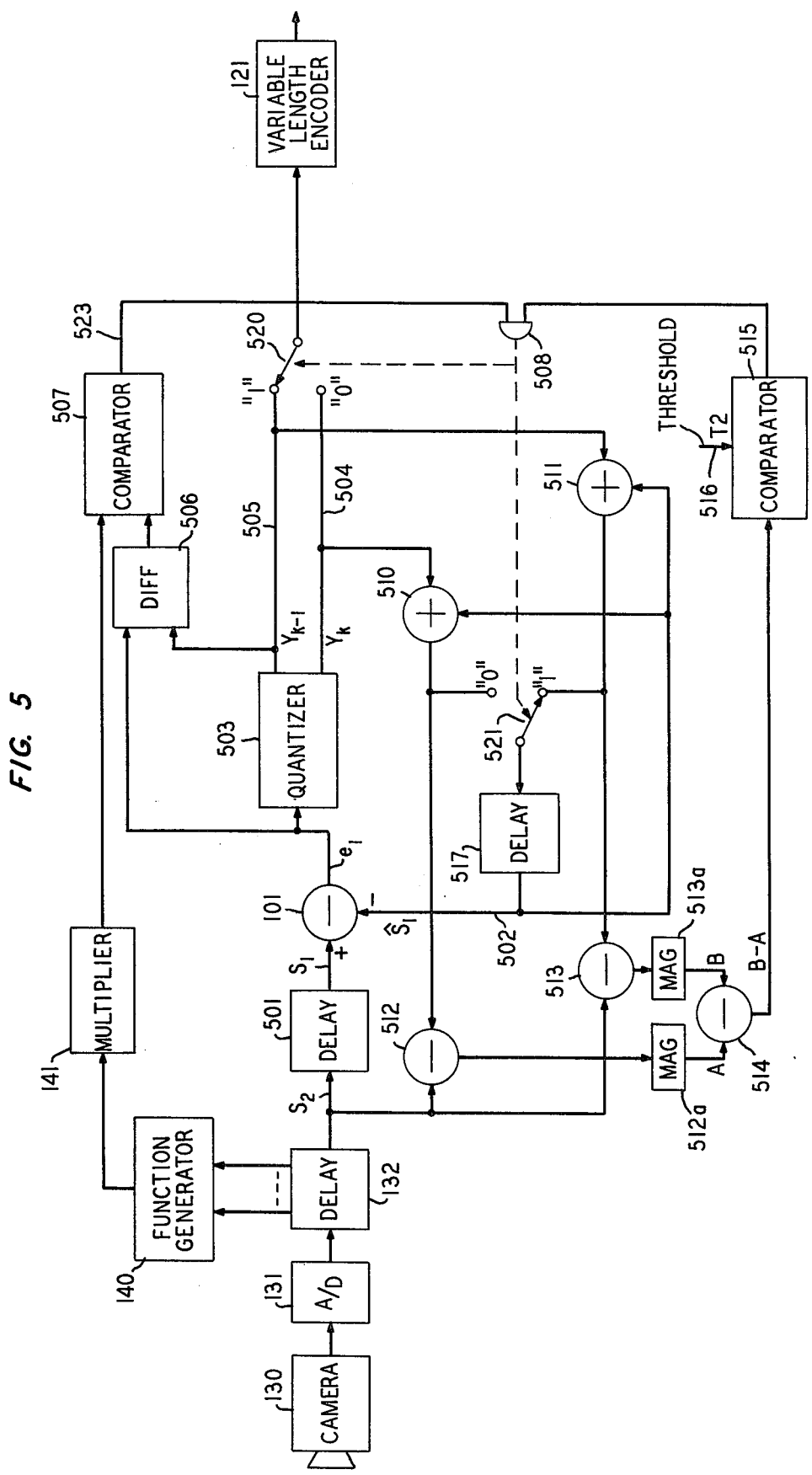
FIG. 5 is a block diagram of a video encoding system wherein the quantizer output may be shifted conditionally, dependent upon its effect on both the present and next encoded samples.

Another arrangement called delayed collapsing, which also shifts the quantizer output from its normal level to another, usually lower level, is shown in block diagram form in FIG. 5. In this arrangement, a decision to shift depends upon two conditions. First, a shift is not made if the magnitude of the prediction error for the next sample assuming a shift is made exceeds the magnitude of the prediction error the the next sample formed using the normal quantizer output by more than a predetermined amount. Second, the shifted value is used only if the quantization error of the present sample (using the shifted value) is smaller than a predetermined threshold which depends upon picture activity. Stated differently, a two-fold test is used in delayed collapsing. The first part of the test pertains to the effect of the shift on the next sample, and only allows the shift if the prediction error for that sample does not deviate too greatly from the prediction error without a shift. The second test is similar to the one described hereinabove for alternate collapsing, namely, that the shift does not produce a quantization error for the present sample which exceeds a threshold which varies as a function of picture activity.

In FIG. 5, the apparatus again includes a delay network 132 which provides samples in the neighborhood of the pel being encoded to a function generator 140 followed by a multiplier 141. An additional output of network 132 is delayed by one sample interval in a second delay circuit 501. The outpout of circuit 501, designated $S_1$, will be called the present sample. The input to circuit 501, designated $S_2$, will be called the next sample.

In a manner similar to that described previously, the difference between the present sample $S_1$ and its predicted value $\hat{S}_1$ from line 502 is formed in subtractor 101, and the error signal $e_1$ thus generated is applied to a quantizer 503. In this embodiment, quantizer 503 produces two representative levels in response to the input level: a normal output level $Y_k$ on line 504 and a collapsed level $Y_{k-1}$ on line 505.

The difference between the collapsed level value $Y_{k-1}$ and the error signal $e_1$ is formed in a differencing circuit 506 and then applied to one input of a comparator 507. Comparator 507 receives its second input from function generator 140 and multiplier 141, and is arranged to generate a high output on line 523 if the difference signal $|e_1 - Y_{k-1}|$ is less than the threshold T set by the picture activity. Line 523 is connected to one input of an AND gate 508.

The normal and collapsed outputs $Y_k$ and $Y_{k-1}$ of quantizer 503 are applied to first input terminals of a pair of adder circuits 510 and 511, respectively, which each additionally receive the previous prediction $\hat{S}_1$ from the delay circuit 517 in the encoder feedback loop. The outputs of adders 510 and 511 are applied to subtractors 512 and 513, respectively, which each also receive the next input sample $S_2$. The magnitude of the outputs of subtractors 512 and 513, computed by magnitude circuits 512a and 513a, are applied to yet another subtractor 514, the output of which is applied to one input of a comparator 515.

Since the output of adder 510 represents the next predicted value of the input signal *assuming* that the quantizer output is $Y_k$, the output of magnitude circuit 512a (signal A) represents the magnitude of the next error signal, also assuming that $Y_k$ was used. In a similar manner, the output of adder 511 represents the next predicted value of the input signal assuming that the quantizer output has been collapsed to $Y_{k-1}$. The output of magnitude circuit 513a (signal B) thus represents the magnitude of the next error signal, also assuming that $Y_{k-1}$ was used. The difference between these two assumptions is computed by subtractor 514 by subtracting the magnitude of signal A from the magnitude of signal B. This difference is applied to a comparator 515 for evaluation against a fixed threshold value $T_2$ applied on line 516. If the difference is less than the threshold, the collapsed level can be used since the shifted prediction error is less than the non-shifted prediction error in magnitude, or the shifted prediction error does not exceed the non-shifted error by more than the threshold value $T_2$. In this event, comparator 515 applies a high signal to the second input of AND gate 508. Otherwise, the input to gate 508 is maintained low.

If both input to AND gate 508 are high, switch 520 is positioned so as to couple the line 505 output ($Y_{k-1}$) to the encoder output to variable length coder 121; simultaneously, switch 521 is positioned so that the output of adder 511 is coupled through delay circuit 517 and thence to subtractor 101 via line 502. If both inputs to AND gate 508 are not high, switches 520 and 521 assume their other positions (shown in FIG. 5) so that the representative level $Y_k$ is transmitted to the remote location and used in the prediction of the next input sample.

(D) Summary of Results

The advantages of the "alternate" and "delayed" collapsing techniques have been verified by computer simulations which compare these techniques both to conventional encoding and encoding using other forms of collapsing. The results indicate that the apparatus described herein is successful in reducing entropy by 20–25 percent as compared to non-adaptive techniques. In these simulations, a DPCM quantizer having the transfer characteristics shown in FIG. 2 was used. For the "checker girl" picture, the entropy using conventional coding was found to be 2.93 bits/pel. In evaluating other encoding results picture quality was kept as constant as possible, using subjective criteria.

As a first comparison, a strategy was employed whereby the normal quantizer output $Y_k$ was reduced by one level to $Y_{k-1}$, and the quantization error $|e - Y_{k-1}|$ evaluated against the activity threshold T $a1/f(M)$. If the activity was too low, so that the collapsing would be noticed, the normal value $Y_k$ was retained. However, if the threshold was not exceeded, the level was again collapsed to $Y_{k-1}$ and a further evaluation performed. Still further level collapsing could then occur, as long as the threshold was not exceeded. The foregoing technique achieved an entropy reduction of 0.27 bits/pel, or 9.2 percent, without any noticeable degradation of picture quality. One of the reasons for such a small decrease of entropy is the feedback process inherent in a DPCM coder. If, in quantization of a pel, the adaptive quantizer changes its occupancy from level $\pm k$ to $\pm j$ ($j < k$), then the differential signal to be quantized for the next pel generally increases in magnitude. Thus, there is a good chance that the next quantizer output will occupy a higher quantization level than in the case of a non-adaptive coder. This, to some extent, hampers the original objective of making the distribution of pels in quantizer levels highly peaked or non-uniform.

Since the above-described feedback affects high quantizer levels more severely than low levels, and since the higher quantization levels have little effect on the entropy, the above strategy was modified in a second simulation so as to collapse only the inner $\pm 1$, $\pm 2$, and ±3 levels. The result of this simulation was to reduce the entropy to 2.51 bits/pel, which is a reduction of about 14 percent.

In the simulation of alternate collapsing, using apparatus like that of FIG. 4, the odd levels 1, 3, 5 were collapsed while the even levels remained the same. Level 1, for example, was collapsed to either level 0 or level 2; level 3 was collapsed to level 2 or 4, and so on. This simulation resulted in a significant entropy reduction: the entropy of the quantized output for alternate collapsing was 2.19 bits/pel, which is a decrease of about 25 percent over non-adaptive encoding.

In the delayed collapsing simulation, using apparatus like that of FIG. 5, the threshold value $T_2$ applied to comparator 415 on line 416 was varied between 1 and 15, and a threshold value 5 was found to give the best results. With this value, the simulation resulted in an entropy of 2.28 bits/pel, which is a decrease of about 22 percent over a non-adaptive encoder.

The advantages of alternate and delayed collapsing are graphically illustrated in FIG. 6, wherein the occupancy of the various quantizer levels is shown. Without any adaption, the occupancy of the 15 different levels (given previously in Table 1 for the "checker girl" photo) is shown in curve 601. Curve 602, illustrating alternate collapsing, shows that the odd level occupancy has increased significantly. Curve 603, for delayed collapsing, also illustrates that the level occupancy distribution has been considerably peaked, as is desired.

Various modifications of the technique heretofore described will be apparent to those skilled in the art. For this reason, it is intended that the present invention be limited only by the following claims.

What is claimed is:

1. Apparatus for encoding a series of samples of a video signal representing an image, including,
   (I) a DPCM encoder arranged to receive said samples, including
      (A) means for predicting the value of each of said samples based upon previous outputs from said encoder, and
      (B) means for encoding an error signal indicative of the difference between each of said samples and the predicted version thereof, said encoding means including
         (1) a terminal forming the output of said encoder and the input to said predicting means,
         (2) a quantizer adapted to generate a first signal having a first representative level selected from along a plurality of predefined levels in response to said error signal falling within one of a corresponding plurality of predefined decision ranges, and
         (3) means for generating a second signal having a second representative level selected from among said same plurality of predefined levels in response to said first signal, and
   (II) means for coupling said first or said second signal to said terminal, and
   (III) means for controlling said coupling means as a function of the relative magnitude of a first threshold value indicative of the spatial activity of said video signal and a quantization error signal indicative of the difference between said second signal and said error signal.

2. The invention defined in claim 1 wherein each of said samples represents the intensity of a particular picture element in said image, and said threshold value is a function of the weighted sum of the average of the magnitudes of the horizontal and vertical slopes of the intensity of picture elements neighboring the element being encoded.

3. The invention defined in claim 1 wherein said controlling means further includes
   means for forming first and second differences between a succeeding sample of said video signal and predictions of said succeeding sample made utilizing said first and second signals, respectively, and
   means for determining if the magnitude of said second difference exceeds the magnitude of said first difference by a second threshold value.

4. The invention defined in claim 1 wherein said second signal generating means includes means for determining the relative magnitudes of a first difference between said error signal and one of said predefined representative levels having a magnitude greater than said first representative level and a second difference between said error signal and one of said predefined representative levels having a magnitude smaller than said representative level.

5. Apparatus for encoding a video signal representative of an image, including
   (a) means for generating a series of digital samples of said video signal, each of said samples representing the intensity of said image at a particular picture element,
   (b) a DPCM encoder for generating, in response to said each of said samples, an output signal indicative of the prediction error between said sample and a predicted version thereof, said output signal having a quantized value selected from among a predetermined plurality of possible quantized values,
   (c) means for generating an activity signal indicative of the spatial activity of said image in the vicinity of the picture element being encoded, and
   (d) means for shifting said output signal from its normal quantized value determind by the magnitude of said prediction error to a different quantized value selected from among said plurality of possible values if the difference between said different quantized values and said prediction error bears a predetermined relationship to said activity signal.

6. The invention defined in claim 5 wherein said apparatus further includes means for selecting said different quantized value as the adjacent quantized value immediately above or immediately below said selected quantized value, depending upon the relative magnitude of the quantization error associated with each of said adjacent values.

7. The invention defined in claim 6 further including means for inhibiting the operation of said shifting means if said normal quantized value is certain ones of said possible quantized values.

8. The invention defined in claim 5 wherein said shifting means further includes (1) means for forming the difference between (a) the magnitude of a succeeding sample of said video signal minus a prediction thereof utilizing said different quantized value, and (b) said succeeding samples minus a prediction thereof utilizing said normal quantized value, and (2) means for comparing said difference to a fixed threshold value.

9. Apparatus for encoding a video signal represented by a series of digital samples comprising:

(a) a DPCM encoder for receiving said digital samples, including
  (1) means for forming a prediction signal representative of the value of one of said amples based upon previous quantized output signals from said encoder,
  (2) means for forming a prediction error signal $e$ by subtracting said prediction signal from said sample, and
  (3) means for representing said prediction error signal as a quantized output signal having a value Y selected from a plurality of predetermined representative values $Y_k$, $k=0,1,2...N-1$, each of said representative values normally being associated with a particular range of prediction error signal values,
(b) means for generating a threshold signal functionally related to the spatial activity in the portion of the video signal being encoded, and
(c) means for shifting the output Y of said representing means from said normal value $Y_k$ to a different value $Y_j, j=k$, if the error caused by said shift is less than said threshold signal.

10. The invention defined in claim 9 wherein said shifting means is arranged to shift said normal value $Y_k$ to a different value $Y_{k-1}$ or $Y_{k+1}$ dependent upon the relative magnitude of $|e-Y_{k-1}|$ and $|e-Y_{k+1}|$.

11. The invention defined in claim 10 wherein said shifting means is inhibited if $k$ is an even number. even number.

12. The invention defined in claim 9 wherein said shifting means further includes
  means for forming a first prediction of the next sample of said video signal utilizing said normal value $Y_k$ and a second prediction of said next sample utilizing a different value $Y_{k-1}$, and
  means for comparing the difference between the magnitudes of (a) said next sample less said second prediction and (b) said next sample less said first prediction, with a second threshold.

13. Apparatus for encoding a video signal including
(a) a DPCM encoder including a quantizer adapted to generate a quantized output signal having a value representing the error between the input to said encoder and a predicted version of said input;
(b) means for generating a quantization error signal indicative of the difference between a shifted value of said quantized output signal and said error; and
(c) means for providing an output signal having either said representing value or said shifted value, as a function of the relative magnitudes of said quantization error signal and an activity signal indicative of the spatial activity of said video signal.

14. The invention defined in claim 13 wherein said quantized output of said encoder may assume a plurality of predetermined values and said providing means is arranged to shift only alternate ones of said values to adjacent ones of said predetermined values above or below said alternate values.

15. The invention defined in claim 14 wherein said apparatus further includes means for comparing the quantization error produced by the shifted value above said representing value with the quantization error produced by the shifted value below said representing value.

16. The invention defined in claim 13 wherein said shifted value is smaller than said representing value, and said apparatus further includes means for inhibiting said shift if the predicted version of the next input to said encoder formed using said shifted value would produce a quantization error produced if the predicted version of said next input used said representing value.

17. A method for encoding a sampled video signal which represents an image, including the steps of:
(a) predicting a value for each sample of said video signal based upon previous outputs,
(b) generating a quantized output signal having a value representative of the error between said sample and said predicted version thereof,
(c) generating an activity signal indicative of the spatial activity of said image, and
(d) shifting preselected ones of said quantized values to different values when the relative magnitude of said activity signal bears a predetermined relationship to the difference between said different value and said error.

18. The method of claim 17 further including: predicting the value of the next sample using said representing value and said different value, and
  comparing the magnitude of the errors of each of said predictions with each other to determine if said errors differ by a predetermined amount.

19. A method of encoding an image represented by a series of digital samples of the intensity of said image, including the steps of:
(a) forming a prediction of the value of the one of said samples,
(b) subtracting said prediction from said sample to form a prediction error signal which falls within one of a plurality of predetermined magnitude ranges,
(c) generating, in response to said prediction error signal, a quantized output signal having a magnitude falling within the one of said ranges which normally produces said output,
(d) generating an indication of the spatial activity in said video signal, and
(e) collapsing said quantized output signal to a second magnitude falling outside said range of values only if the difference between said prediction error and said second magnitude bears a predetermined relation to said spatial activity indication.

20. Apparatus for reducing the entropy of an encoded version of a video signal, including:
(a) a DPCM encoder including a forward loop and a feedback loop, said forward loop including a difference circuit arranged to couple an error signal to a quantizer to generate an output signal having a representative value indicative of the difference between said video signal and a predicted version thereof, said feedback loop including a predictor for forming said predicted version by accumulating said output signals,
(b) means for providing an indication of the activity of said video signal,
(c) means operative to control the input/output characteristics of said quantizer to change said output signal to a value different from said representative value, and
(d) means for operating said control means in response to the relative magnitudes of (1) the difference between said error signal and said different value and (2) said activity indication.

* * * * *